United States Patent
Huang et al.

(10) Patent No.: US 12,003,445 B2
(45) Date of Patent: Jun. 4, 2024

(54) MULTIPLE USER (MU) SUPPORT FOR REFERENCE SIGNAL (RS) AND DATA MULTIPLEXING ON SHARED UPLINK (UL) RESOURCES(S)

(71) Applicant: QUALCOMM Incorporated, San Diego, CA (US)

(72) Inventors: Yi Huang, San Diego, CA (US); Peter Gaal, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/448,625

(22) Filed: Sep. 23, 2021

(65) Prior Publication Data
US 2022/0103323 A1 Mar. 31, 2022

Related U.S. Application Data

(60) Provisional application No. 63/084,948, filed on Sep. 29, 2020.

(51) Int. Cl.
*H04L 5/00* (2006.01)
*H04W 72/1268* (2023.01)

(52) U.S. Cl.
CPC .......... *H04L 5/0048* (2013.01); *H04L 5/0007* (2013.01); *H04W 72/1268* (2013.01)

(58) Field of Classification Search
CPC ... H04L 5/0048; H04L 5/0007; H04L 5/0023; H04L 27/26134; H04L 27/2636;
(Continued)

(56) References Cited

U.S. PATENT DOCUMENTS 9,854,569 B2* 12/2017 Yang .................. H04W 72/21
2011/0096657 A1* 4/2011 Luo .................... H04L 5/0001
370/330
(Continued)

FOREIGN PATENT DOCUMENTS

WO 2020056018 A1 3/2020

OTHER PUBLICATIONS

Ericsson: "On the Design of Long PUCCH for More than 2 Bits UCI", 3GPP TSG-RAN WG1 Meeting #90, 3GPP Draft, R1-1714423, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21-Aug. 25, 2017, Aug. 20, 2017 (Aug. 20, 2017), XP051317202, 10 Pages.
(Continued)

*Primary Examiner* — Hardikkumar D Patel
(74) *Attorney, Agent, or Firm* — QUALCOMM IP DEPT.; James Hunt Yancey, Jr.

(57) ABSTRACT

Certain aspects of the present disclosure provide techniques for applying a mechanism to signals, from different user equipments (UEs), multiplexed for UL transmission, such that the mechanism differentiates one UE's waveform from another UE's, even if the waveforms are on the same time resources. A method that may be performed by a UE includes determining a mechanism to allow the UE to share uplink (UL) resources with at least one other UE for UL transmission, applying the mechanism to at least one of RS symbols or information symbols to be multiplexed using orthogonal frequency division multiplexing (OFDM) before performing a discrete Fourier transform (DFT) for the UL transmission, and outputting a waveform for the UL transmission after performing the DFT and an inverse fast Fourier transform (IFFT).

28 Claims, 13 Drawing Sheets

(58) Field of Classification Search
CPC ... H04L 5/0051; H04L 5/0019; H04L 5/0053; H04L 27/2634; H04W 72/1268; H04B 7/06

See application file for complete search history.

(56) References Cited

U.S. PATENT DOCUMENTS

| | | | |
|---|---|---|---|
| 2016/0065341 A1* | 3/2016 | Yoo | H04L 25/0224 370/336 |
| 2016/0295561 A1* | 10/2016 | Papasakellariou | H04W 72/23 |
| 2018/0198660 A1* | 7/2018 | Huang | H04J 11/00 |
| 2019/0068424 A1 | 2/2019 | Park et al. | |

OTHER PUBLICATIONS

International Search Report and Written Opinion—PCT/US2021/071578—ISA/EPO—dated Jan. 4, 2022 (208303WO).

Qualcomm Incorporated: "Lower PAPR Reference Signals", 3GPP Draft, R1-1905029, 3GPP TSG RAN WG1 #96bis, Lower PAPR Reference Signals, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8-Apr. 12, 2019, Apr. 7, 2019 (Apr. 7, 2019), XP051700138, 11 Pages.

Qualcomm Incorporated: "Lower PAPR Reference Signals", 3GPP TSG RAN WG1 Meeting #95, 3GPP Draft; R1-1813445 Lower PAPR Reference Signals, 3rd Generation Partnership Project (3GPP), Mobile Competence Centre, 650, Route Des Lucioles, F-06921 Sophia-Antipolis Cedex, France, vol. RAN WG1, No. Spokane, WA, USA, Nov. 12-Nov. 16, 2018, Nov. 3, 2018 (Nov. 3, 2018), pp. 1-24, XP051479767.

\* cited by examiner

MULTIPLE USER (MU) SUPPORT FOR REFERENCE SIGNAL (RS) AND DATA MULTIPLEXING ON SHARED UPLINK (UL) RESOURCES(S)

CROSS-REFERENCE TO RELATED APPLICATION(S)

This application claims priority to U.S. Provisional Application No. 63/084,948 filed Sep. 29, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for indicating carrier grouping for multiple user (MU) communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved communication with multiple users.

Certain aspects of the subject matter described in this disclosure can be implemented in a method for wireless communication by a user equipment (UE). The method generally includes determining a mechanism to allow the UE to share uplink (UL) resources with at least one other UE for uplink (UL) transmission, applying the mechanism to at least one of reference signal (RS) symbols or information symbols to be multiplexed using orthogonal frequency division multiplexing (OFDM) before performing a discrete Fourier transform (DFT) for the UL transmission, and outputting a waveform for the UL transmission after performing the DFT and an inverse fast Fourier transform (IFFT).

Certain aspects of the subject matter described in this disclosure can be implemented in a method for wireless communication by a network entity. The method generally includes receiving a waveform with UL transmissions from different UEs on shared UL resources and applying a mechanism to distinguish at least one of RS symbols or information symbols multiplexed using OFDM from the different UEs after performing a FFT of the waveform, extracting tones for each of the different UEs, and performing an IDFT.

Certain aspects of the subject matter described in this disclosure can be implemented in an apparatus for wireless communications by a UE. The apparatus generally includes at least one processor; and a memory coupled to the least at least one processor to cause the apparatus to: determine a mechanism to allow the UE to share UE resources with at least one other UE for UL transmission, apply the mechanism to at least one of RS symbols or information symbols to be multiplexed using OFDM before performing a DFT for the UL transmission, and output a waveform for the UL transmission after performing the DFT and an IFFT.

Certain aspects of the subject matter described in this disclosure can be implemented in an apparatus for wireless communications by a network entity. The apparatus generally includes at least one processor; and a memory coupled to the least at least one processor to cause the apparatus to: receive a waveform with UL transmissions from different UEs on shared UL resources and apply a mechanism to distinguish at least one of RS symbols or information symbols multiplexed using OFDM from the different UEs after performing a FFT of the waveform, extracting tones for each of the different UEs, and performing an IDFT.

Certain aspects of the subject matter described in this disclosure can be implemented in an apparatus for wireless communications by a UE. The apparatus generally includes means for determining a mechanism to allow the UE to share UE resources with at least one other UE for UL transmission, means for applying the mechanism to at least one of RS symbols or information symbols to be multiplexed using OFDM before performing a DFT for the UL transmission, and means for outputting a waveform for the UL transmission after performing the DFT and an IFFT.

Certain aspects of the subject matter described in this disclosure can be implemented in an apparatus for wireless communications by a network entity. The apparatus generally includes means for receiving a waveform with UL transmissions from different UEs on shared UL resources and means for applying a mechanism to distinguish at least one of RS symbols or information symbols multiplexed using OFDM from the different UEs after performing a FFT of the waveform, extracting tones for each of the different UEs, and performing an IDFT.

Certain aspects of the subject matter described in this disclosure can be implemented in a computer-readable medium for wireless communications including instructions that, when executed by a processing system in a UE, cause the processing system to perform operations including: determining a mechanism to allow the UE to share UE resources with at least one other UE for UL transmission, applying the mechanism to at least one of RS symbols or information symbols to be multiplexed using OFDM before performing a DFT for the UL transmission, and outputting a waveform for the UL transmission after performing the DFT and an IFFT.

Certain aspects of the subject matter described in this disclosure can be implemented in a computer-readable medium for wireless communications including instructions that, when executed by a processing system in a network entity, cause the processing system to perform operations including: receiving a waveform with UL transmissions from different UEs on shared UL resources and applying a mechanism to distinguish at least one of RS symbols or information symbols multiplexed using OFDM from the different UEs after performing a FFT of the waveform, extracting tones for each of the different UEs, and performing an IDFT.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
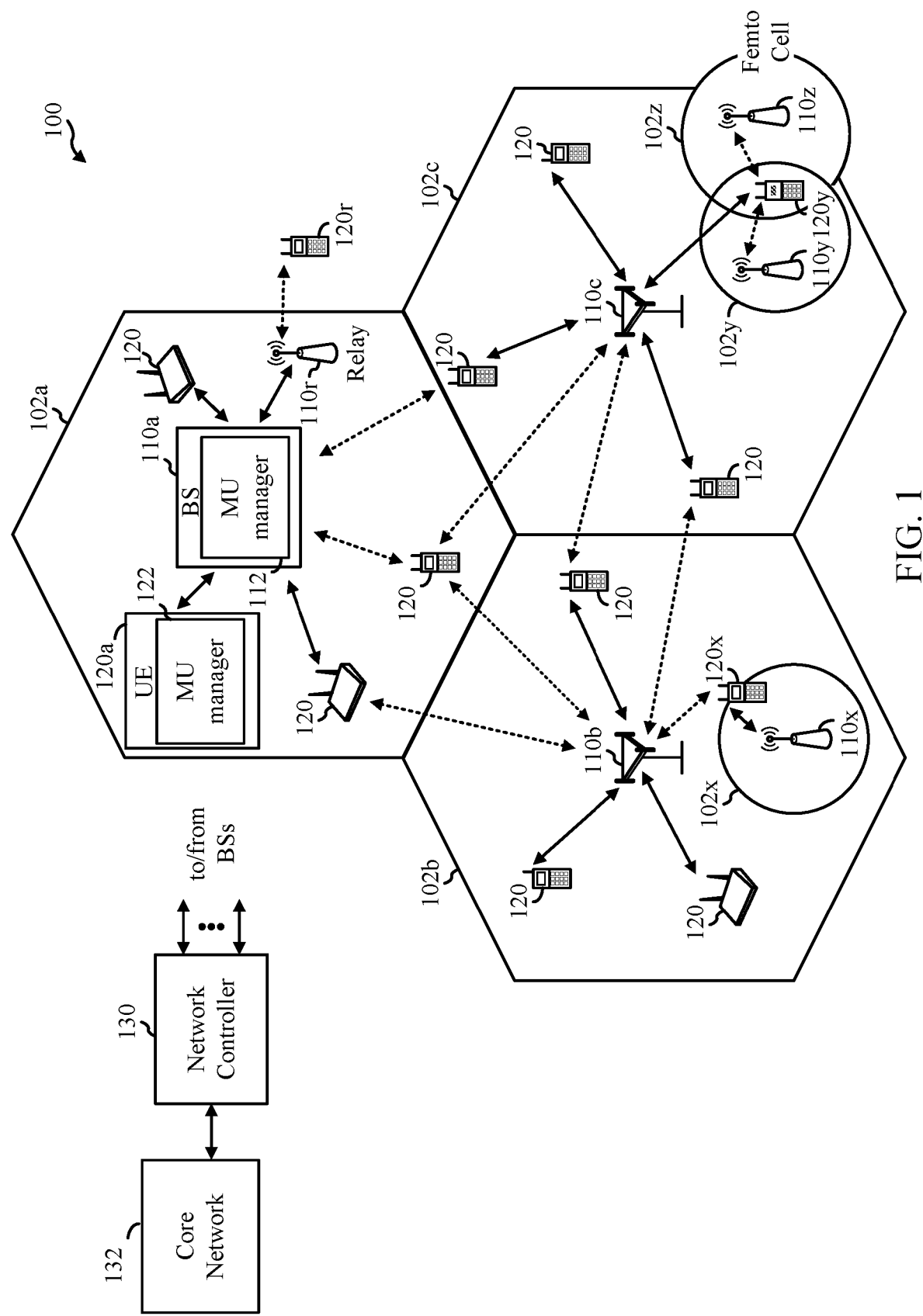
FIG. 1 is a block diagram conceptually illustrating an example wireless communication network, in accordance with certain aspects of the present disclosure.

Aspects of the present disclosure provide apparatus, methods, processing systems, and computer-readable mediums for a user equipment (UE) to share uplink (UL) resources with at least one other UE for UL transmission. In particular, in multiple user (MU) applications, multiple users (e.g., two or more UEs) may be scheduled (and share) the same UL resources. In such MU applications, a waveform for UL transmission from multiple UEs may arrive at a network entity, and the network entity may need a mechanism to distinguish the signals (e.g., reference signals (RSs), information, data, etc.) of the different UEs.

Accordingly, certain aspects of the present disclosure provide techniques for applying a mechanism to signals, from different UEs, multiplexed for UL transmission, such that the mechanism differentiates one UE's waveform from another UE's waveform, even if the waveforms are on the same time resources. In some cases, the mechanism is an orthogonal cover code (OCC) applied to RS (e.g., demodulations reference signal (DMRS)) symbols (e.g., symbols carrying RSs) or information (e.g., uplink control information (UCI) or data) symbols (e.g., symbols carrying information). In some cases, application of the OCC to RS symbols may achieve block level spreading or symbol level spreading of the of the RS symbols. In some cases, application of the OCC to information symbols may achieve block level spreading or symbol level spreading of the information symbols.

The following description provides examples of mechanisms for UL transmission in MU applications, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access (for example, 5G NR) may support various wireless communication services, such as enhanced mobile broadband (eMBB) targeting wide bandwidth (e.g., 80 megahertz (MHz) or beyond), millimeter wave (mmWave) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same time-domain resource (for example, a slot or subframe) or frequency-domain resource (for example, component carrier (CC)). NR supports beamforming, and beam direction may be dynamically configured.

Multiple-input multiple-output (MIMO) transmissions with precoding may also be supported. MIMO configurations in the downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications Network

FIG. 1 illustrates an example wireless communication network 100 in which aspects of the present disclosure may be performed. For example, as shown in FIG. 1, wireless communication network 100 may include a user equipment (UE) 120a configured to perform operations 500 of FIG. 5 and/or a base station (BS) 110a configured to perform operations 600 of FIG. 6 to support multiple user (MU) communication.

As shown in FIG. 1, BS 110a includes an MU manager 112. MU manager 112 may be configured to receive a waveform with uplink (UL) transmissions from different UEs 120 on shared UL resources, and apply a mechanism to distinguish at least one of reference signal (RS) symbols or information symbols from the different UEs, in accordance with certain aspects of the present disclosure. Similarly, UE 120a includes an MU manager 122. MU manager 122 may be configured to determine a mechanism to allow UE 120a to share UL resources with at least one other UE 120 for UL transmission, apply the mechanism to at least one of RS symbols or information symbols before performing a discrete Fourier transform (DFT) for the UL transmission, and output a waveform for the UL transmission after performing the DFT and an inverse fast Fourier transform (IFFT), in accordance with certain aspects of the present disclosure.

Wireless communication network 100 may be a new radio (NR) system (e.g., a 5G NR network). As shown in FIG. 1, wireless communication network 100 may be in communication with a core network 132. Core network 132 may in communication with one or more (BSs 110 and/or UEs 120 in wireless communication network 100, via one or more interfaces.

As illustrated in FIG. 1, wireless communication network 100 may include a number of BSs 110a-z (each also individually referred to herein as BS 110 or collectively as BSs 110) and other network entities. ABS 110 may provide communication coverage for a particular geographic area, sometimes referred to as a "cell", which may be stationary or may move according to the location of a mobile BS 110. In some examples, BSs 110 may be interconnected to one another and/or to one or more other BSs 110 or network nodes (not shown) in wireless communication network 100, through various types of backhaul interfaces (e.g., a direct physical connection, a wireless connection, a virtual network, or the like) using any suitable transport network. In the example shown in FIG. 1, BSs 110a, 110b and 110c may be macro BSs for the macro cells 102a, 102b and 102c, respectively. BS 110x may be a pico BS for a pico cell 102x. BSs 110y and 110z may be femto BSs for femto cells 102y and 102z, respectively. ABS 110 may support one or multiple cells. BSs 110 communicate with UEs 120a-y (each also individually referred to herein as UE 120 or collectively as UEs 120) in wireless communication network 100. UEs 120 (e.g., 120x, 120y, etc.) may be dispersed throughout wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and send a transmission of the data and/or other information to a downstream station (e.g., a UE 120 or a BS 110), or that relay transmissions between UEs 120, to facilitate communication between devices.

A network controller 130 may couple to a set of BSs 110 and provide coordination and control for these BSs 110. Network controller 130 may communicate with BSs 110 via a backhaul. BSs 110 may also communicate with one another (for example, directly or indirectly) via wireless or wireline backhaul.

Figure 2:
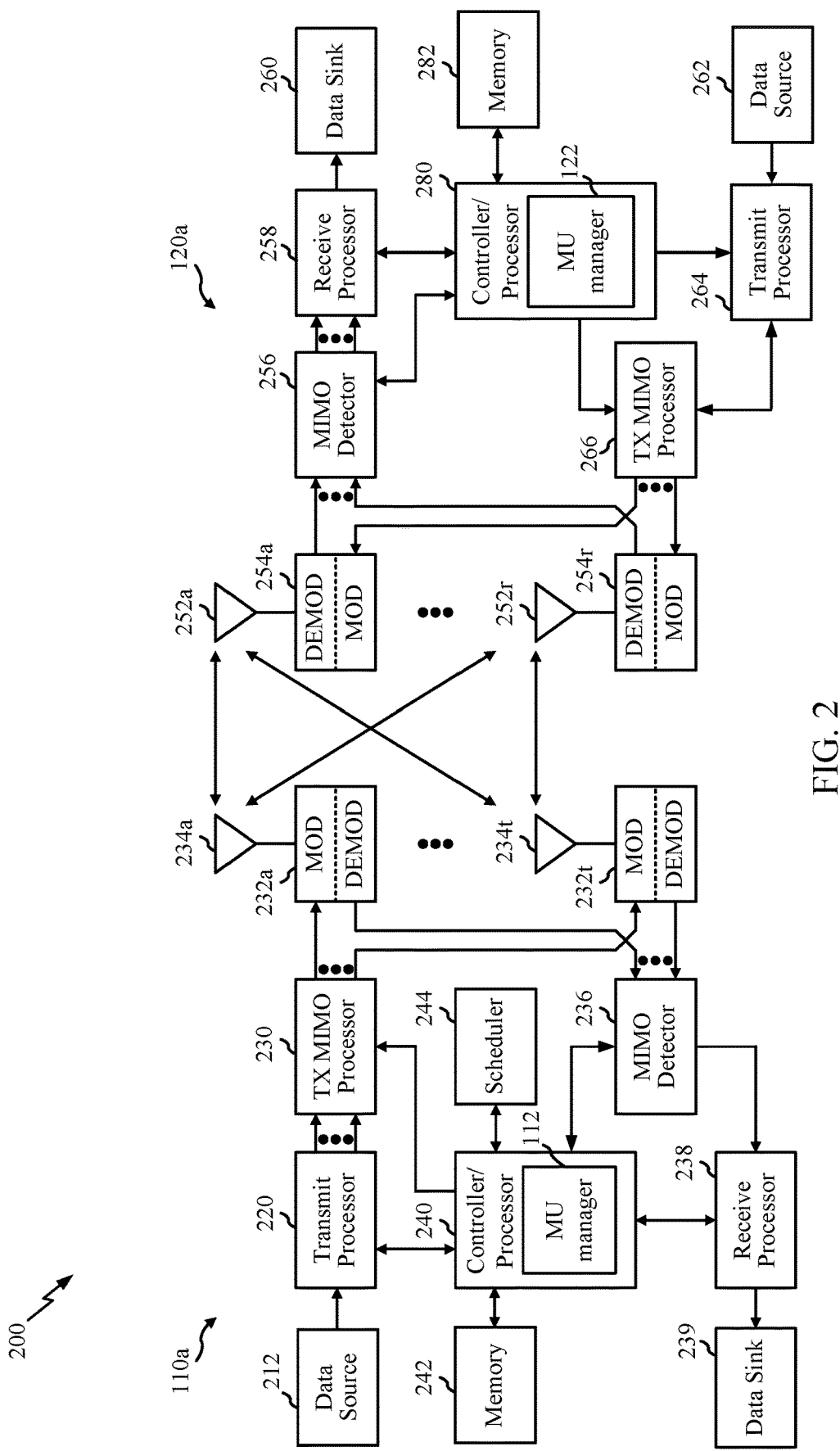
FIG. 2 is a block diagram illustrating an example base station (BS) and an example user equipment (UE), in accordance with certain aspects of the present disclosure.

FIG. 2 is a block diagram illustrating an example BS 110a and an example UE 120a (e.g., in wireless communication network 100 of FIG. 1), in accordance with certain aspects of the present disclosure.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a downlink (DL) signal. DL signals from modulators in transceivers 232a-232t may be transmitted via the antennas 234a-234t, respectively.

At UE 120a, antennas 252a-252r may receive the DL signals from BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from controller/processor 280. Transmit processor 264 may also generate reference symbols for an RS (e.g., for the sounding reference signal (SRS)). The symbols from transmit processor 264 may be precoded by a TX MIMO processor 266 if applicable, further processed by the modulators (MODs) in transceivers 254a-254r (e.g., for single-carrier frequency division multiplexing (SC-FDM), etc.), and transmitted to BS 110a. At BS 110a, the UL signals from UE 120a may be received by antennas 234, processed by modulators in transceivers 232a-232t, detected by MIMO detector 236 if applicable, and further processed by receive processor 238 to obtain decoded data and control information sent by UE 120a. Receive processor 238 may provide the decoded data to data sink 239 and the decoded control information to controller/processor 240.

Memories 242 and 282 may store data and program codes for BS 110a and UE 120a, respectively. Scheduler 244 may schedule UEs 120 for data transmission on the DL and/or UL.

Antennas 252, processors 266, 258, 264, and/or controller/processor 280 of UE 120a and/or antennas 234, processors 220, 230, 238, and/or controller/processor 240 of BS 110a may be used to perform the various techniques and methods described herein. For example, as shown in FIG. 2, controller/processor 240 of BS 110a has an MU manager 112 that may be configured to perform operations 600 of FIG. 6. Similarly, as shown in FIG. 2, controller/processor 280 of UE 120a has an MU manager 122 that may be configured to perform operations 500 of FIG. 5. Although shown at the controller/processor, other components of UE 120a and BS 110a may be used to perform the operations described herein.

NR may utilize OFDM with a cyclic prefix (CP) on the UL and DL. NR may support half-duplex operation using time division duplexing (TDD). OFDM and SC-FDM partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kilohertz (KHz) and other SCS may be defined with respect to the base SCS (e.g., 30 kHz, 60 kHz, 120 kHz, 240 kHz, etc.).

Figure 3:
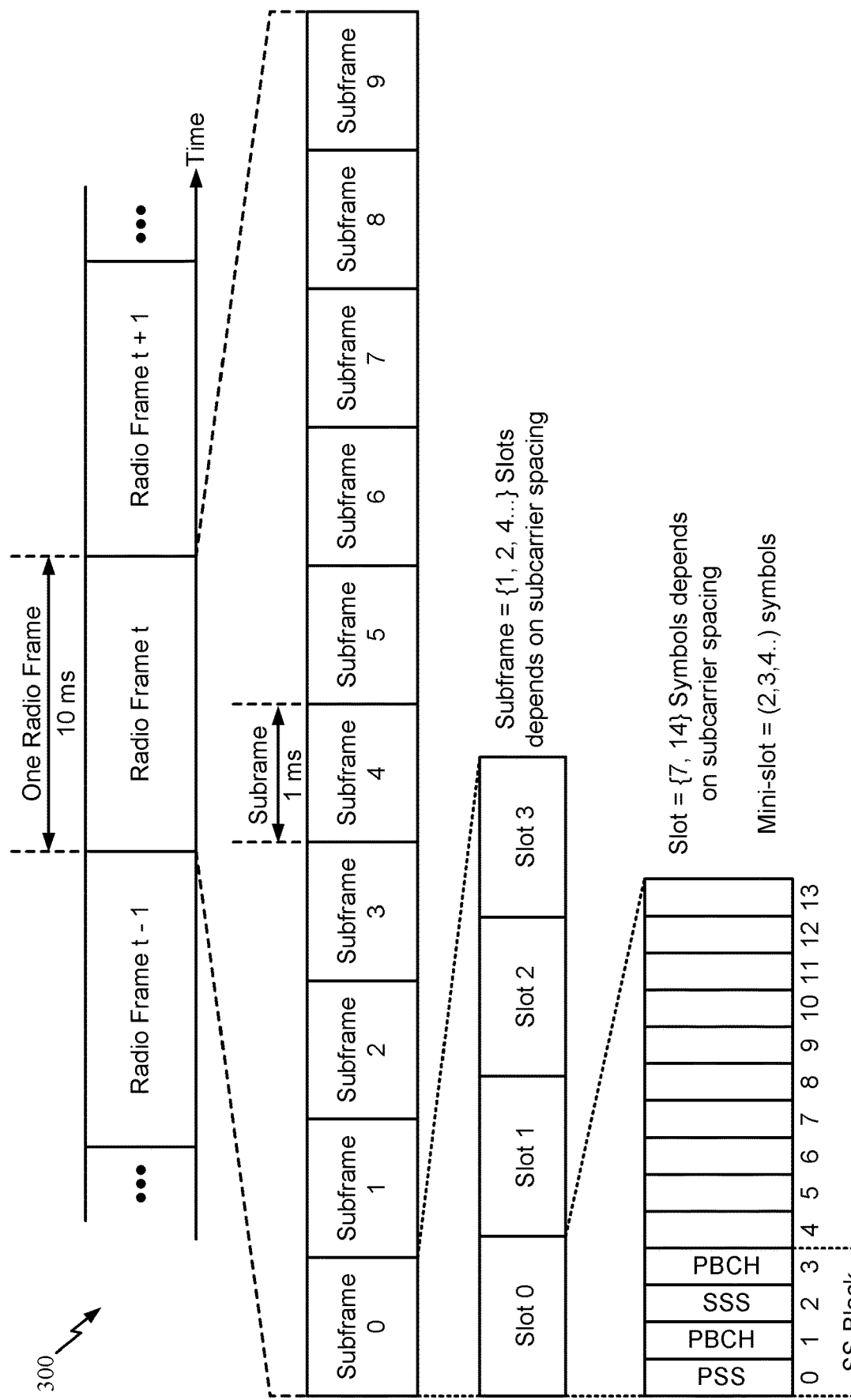
FIG. 3 is an example frame format for new radio (NR), in accordance with certain aspects of the present disclosure.

FIG. 3 is a diagram showing an example of a frame format 300 for certain wireless communication networks (e.g., NR), in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval (TTI) having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Multiple User (MU) Support for Reference Signal (RS) and Data Pre Discrete Fourier Transform (pre-DFT) Multiplexing for Uplink (UL) Transmission Aspects of the present disclosure provide techniques for a user equipment (UE) to share uplink (UL) resources (e.g., frequency resources of a same symbol) with at least one other UE for UL transmission to a network entity. For example, aspects of the present disclosure introduce mechanism(s) to apply to reference signals (RSs), including demodulation reference signals (DMRSs), and information, including data or uplink control information (UCI), to be multiplexed for UL transmission, such that a network entity is able to distinguish the RSs and information of the different UEs.

Figure 4:
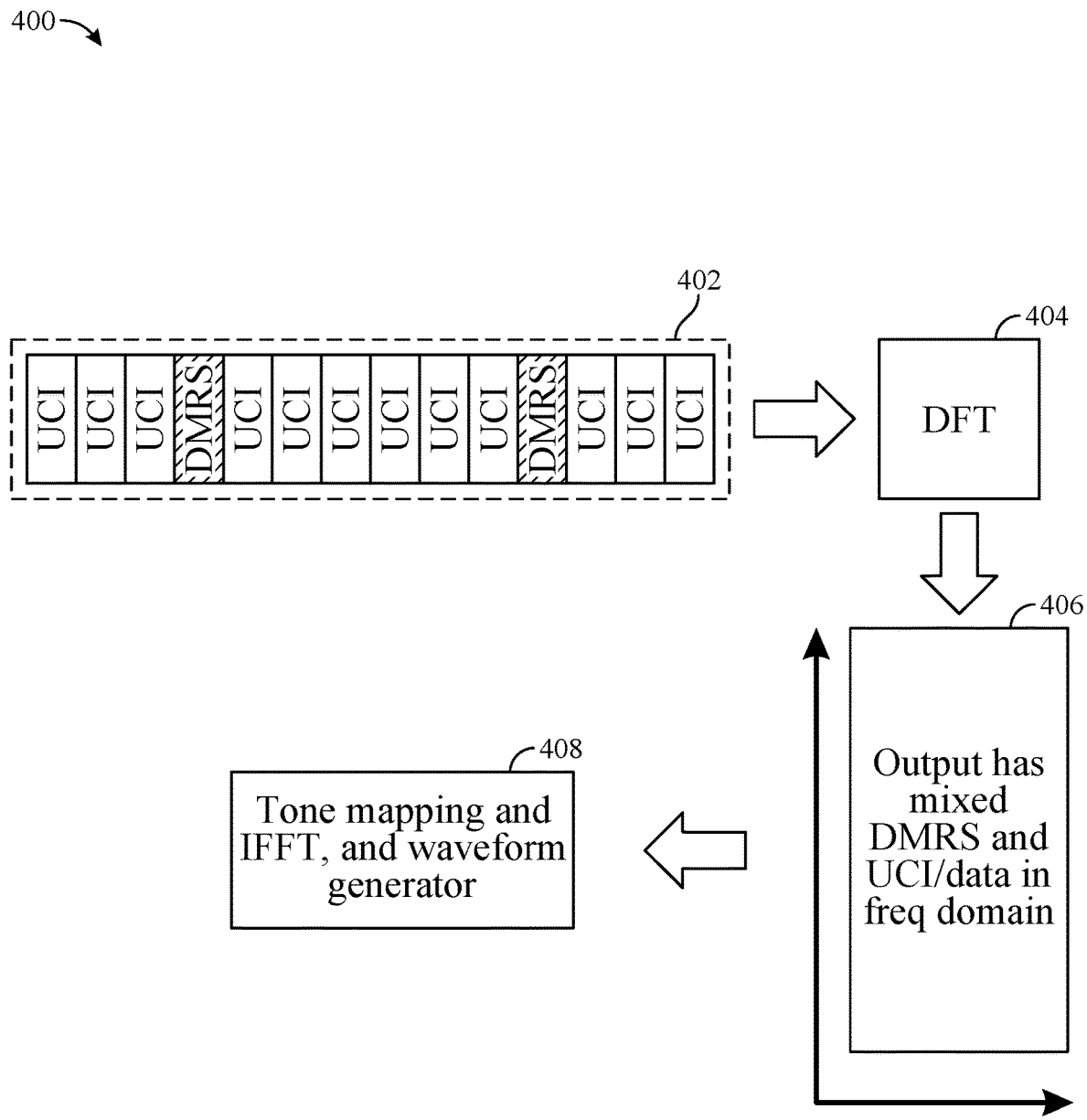
FIG. 4 is a block diagram depicting an example pre-discrete Fourier transform (pre-DFT) waveform, in accordance with certain aspects of the present disclosure.

FIG. 4 is a block diagram 400 depicting a pre-discrete Fourier transform (pre-DFT) multiplexing for a transmitter (e.g., a UE), in accordance with certain aspects of the present disclosure. Pre-DFT multiplexing may be performed for most, or all, orthogonal frequency division multiplexed (OFDM) symbols. Pre-DFT multiplexing may aid in maintaining a DFT spread OFDM (DFT-S-OFDM) waveform for transmission.

As shown in FIG. 4, an UL transmission may be a physical uplink control channel (PUCCH) or a physical uplink shared channel (PUSCH) including both RSs, such as DMRSs, and information, such as UCI. In particular, at 402, UCI symbols and DMRS symbols may be multiplexed, and, at 404, undergo a DFT. While the example of FIG. 4 illustrates UCI multiplexed with DMRSs, other types of information (e.g., PUSCH data payload) may be multiplexed with the DMRSs.

The output 406 of the DFT has mixed DMRS and UCI (or data) in the frequency domain. At 408, the transmitter performs tone mapping, applies an inverse fast Fourier transform (IFFT) (or an inverse DFT (IDFT)) to the output 406, and generates a time domain waveform for transmission. The time domain waveform may be for UL transmission to a network entity.

In some cases, multiple users (e.g., two or more UEs) may be scheduled on (and share) the same PUCCH and/or PUSCH resources, which may be referred to as multiple user (MU) support of PUCCH and/or PUSCH. In some cases, multiple users may be separated in an orthogonal fashion such that the multiple users do not share overlapping resources (e.g., orthogonal MU with different users assigned different tones). Furthermore, orthogonality may need to be preserved, for example, on DMRS and UCI/data when a network entity (e.g., base station (BS)) is receiving data from the multiple users. Multiple users may also be separated in a non-orthogonal fashion (e.g., non-orthogonal MU) where the multiple users share at least some overlapping resources.

In such MU applications, a waveform for UL transmission from multiple UEs may arrive at a network entity and the network entity may need a mechanism to distinguish the signals (e.g., RSs, DMRSs, UCI, and/or data) of the different users. Accordingly, certain aspects of the present disclosure provide techniques for applying a mechanism to RSs (e.g., DMRSs) and/or information (e.g., UCI, data, etc.), from different UEs, multiplexed for UL transmission, such that the mechanism differentiates one UE's waveform from another UE's waveform, even if the waveforms are on the same time resources. The mechanism described herein, may allow a UE to share UL resources with at least one other UE for UL transmission of RSs (e.g., DMRSs) and/or information (e.g., UCI, data, etc.). As will be described in greater detail below, in some cases, each UE may be assigned a mechanism, such as an orthogonal cover code (an OCC specific to each UE), to be applied in various fashions by each UE to RSs (e.g., DMRSs) and/or information (e.g., data) prior to undergoing a DFT (or FFT).

Figure 5:
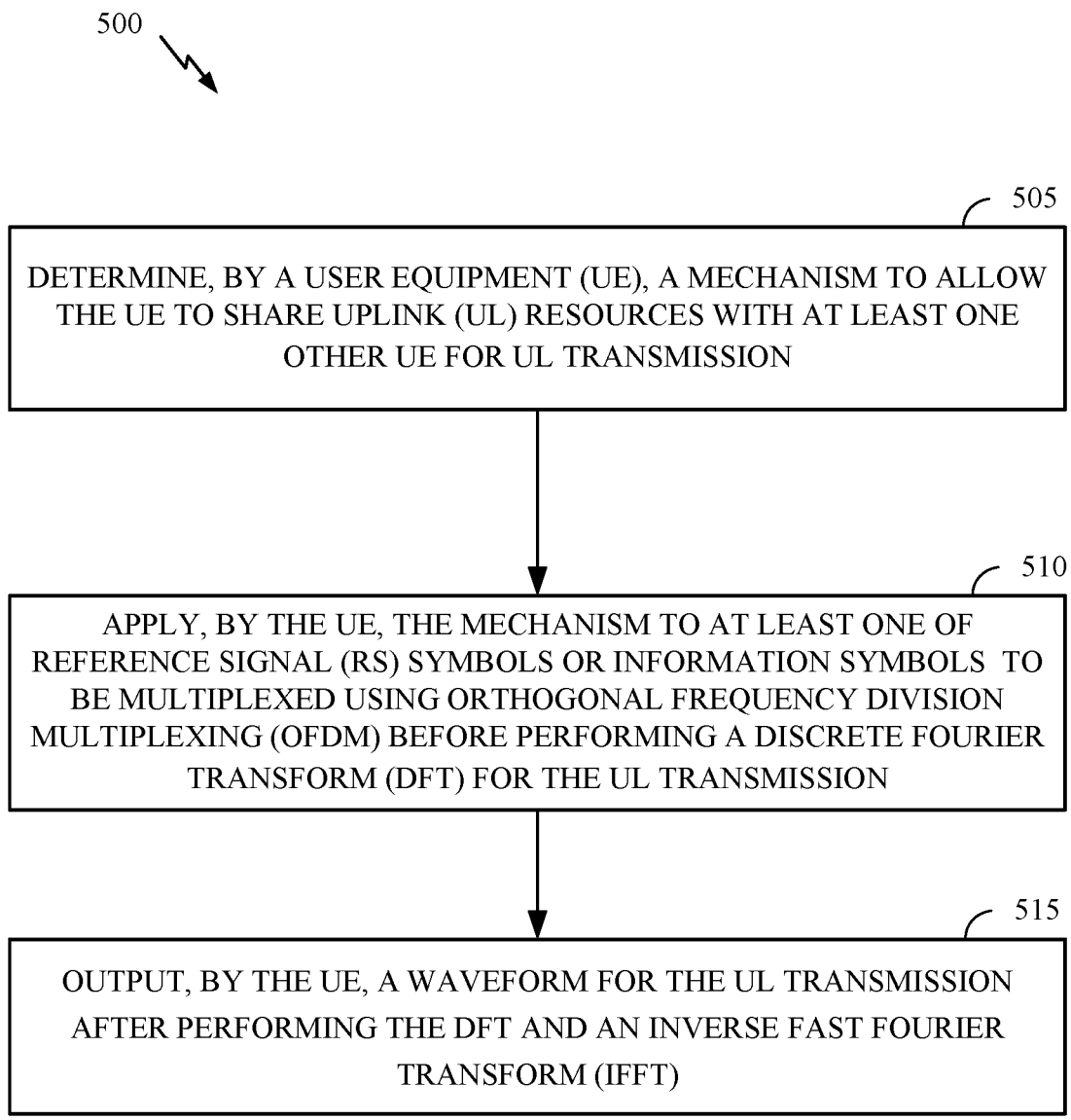
FIG. 5 is a flow diagram illustrating example operations for wireless communication by a UE, in accordance with certain aspects of the present disclosure.

FIG. 5 is a flow diagram illustrating example operations 500 for wireless communication by a UE, in accordance with certain aspects of the present disclosure. Operations 500 may be performed, for example, by UE 120a in wireless communication network 100 of FIG. 1.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 500 begin, at block 505, by determining a mechanism to allow the UE to share UL resources with at least one other UE for UL transmission. As mentioned, the mechanism may be an OCC specific to each of the UEs. In some cases, the UE may receive, from a network entity, an indication of the mechanism to apply to allow the UE to share the UL resources with the at least one other UE for UL transmission; thus, the UE may determine the mechanism, at block 505, based, at least in part, on the received indication.

At block 510, the UE applies the mechanism to at least one of RS symbols or information (e.g., UCI, data, etc.) symbols to be multiplexed using orthogonal frequency division multiplexing (OFDM) before performing a DFT for the UL transmission. As explained in further detail below, application of the mechanism assigned to each UE may involve the use of the same or different DMRS sequences for each of the different UEs. FIGS. 7 and 8 illustrate how a UE may apply different OCCs to DMRS and/or UCI pre-DFT.

At 515, the UE outputs a waveform for the UL transmission after performing the DFT and an inverse fast Fourier transform (IFFT).

Figure 6:
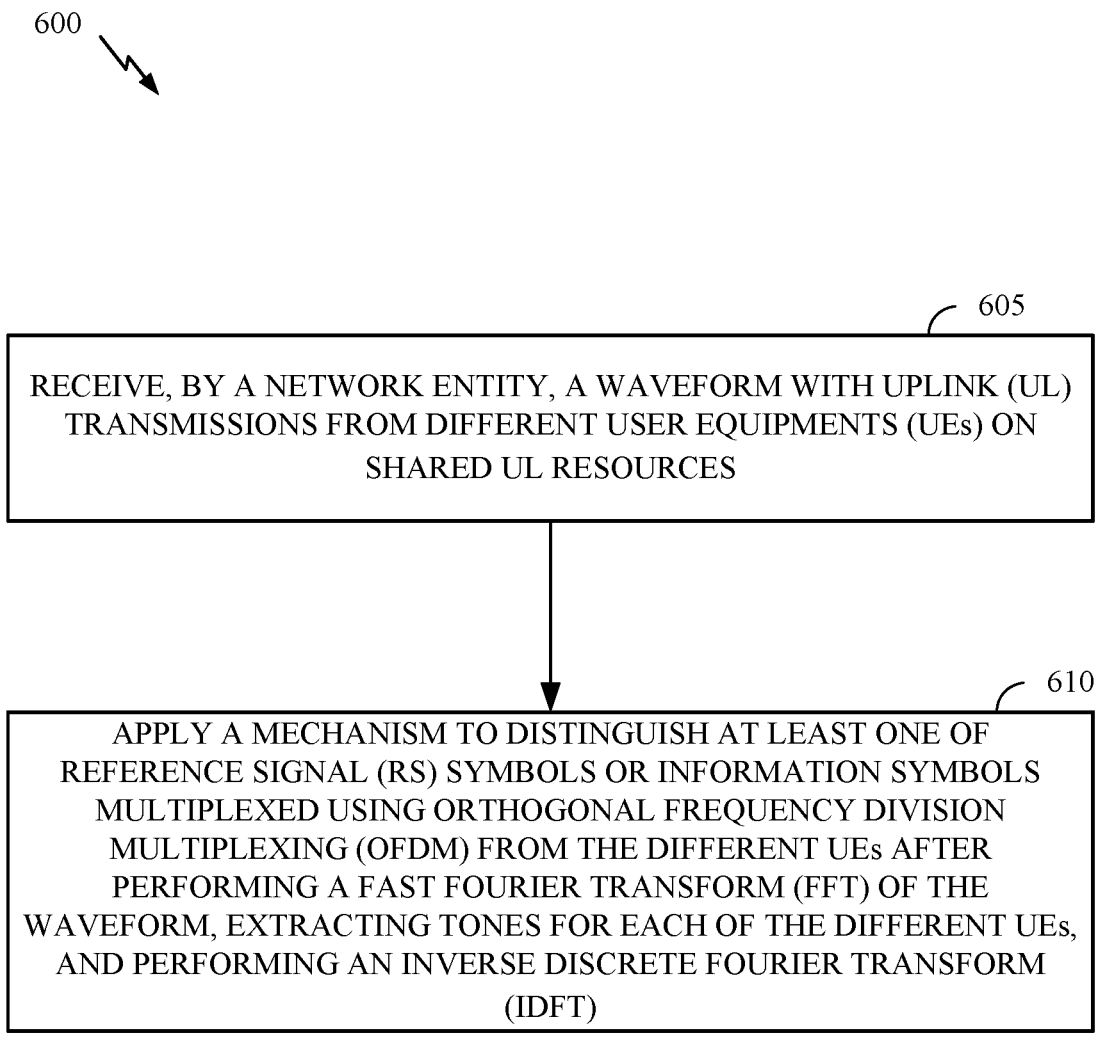
FIG. 6 is a flow diagram illustrating example operations for wireless communication by a network entity, in accordance with certain aspects of the present disclosure.

FIG. 6 is a flow diagram illustrating example operations 600 for wireless communication by a network entity, in accordance with certain aspects of the present disclosure. Operations 600 of FIG. 6 may be considered complementary to operations 500 of FIG. 5. For example, operations 600 may be performed by a BS, such as BS 110a in wireless communication network 100 of FIG. 1, to process MU transmissions from UEs (sent in accordance with operations 500 of FIG. 5).

Operations 600 may be implemented as software components that are executed and run on one or more processors (e.g., controller/processor 240 of FIG. 2). Further, the transmission and reception of signals by the network entity in operations 600 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 600 may begin, at 605, by a network entity receiving a waveform with UL transmissions from different user equipments (UEs) on shared UL resources.

At 610, the network entity applies a mechanism to distinguish at least one of reference signal (RS) symbols or information (e.g., data) symbols multiplexed using OFDM from the different UEs after performing an FFT of the waveform, extracting tones for each of the different UEs, and performing an inverse discrete Fourier transform (IDFT).

Operations 500 and 600 of FIGS. 5 and 6, respectively, may be understood with reference to the examples shown in FIGS. 7A-7C and FIGS. 8A-8B.

Figure 7A:
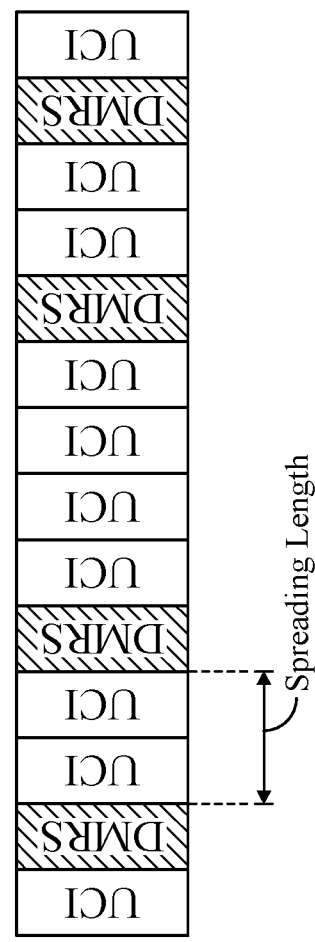
FIGS. 7A, 7B, and 7C illustrate example mechanism applications for sharing uplink (UL) resources for demodulation reference signal (DMRS) transmissions from different UEs, in accordance with certain aspects of the present disclosure.
Figure 7B:
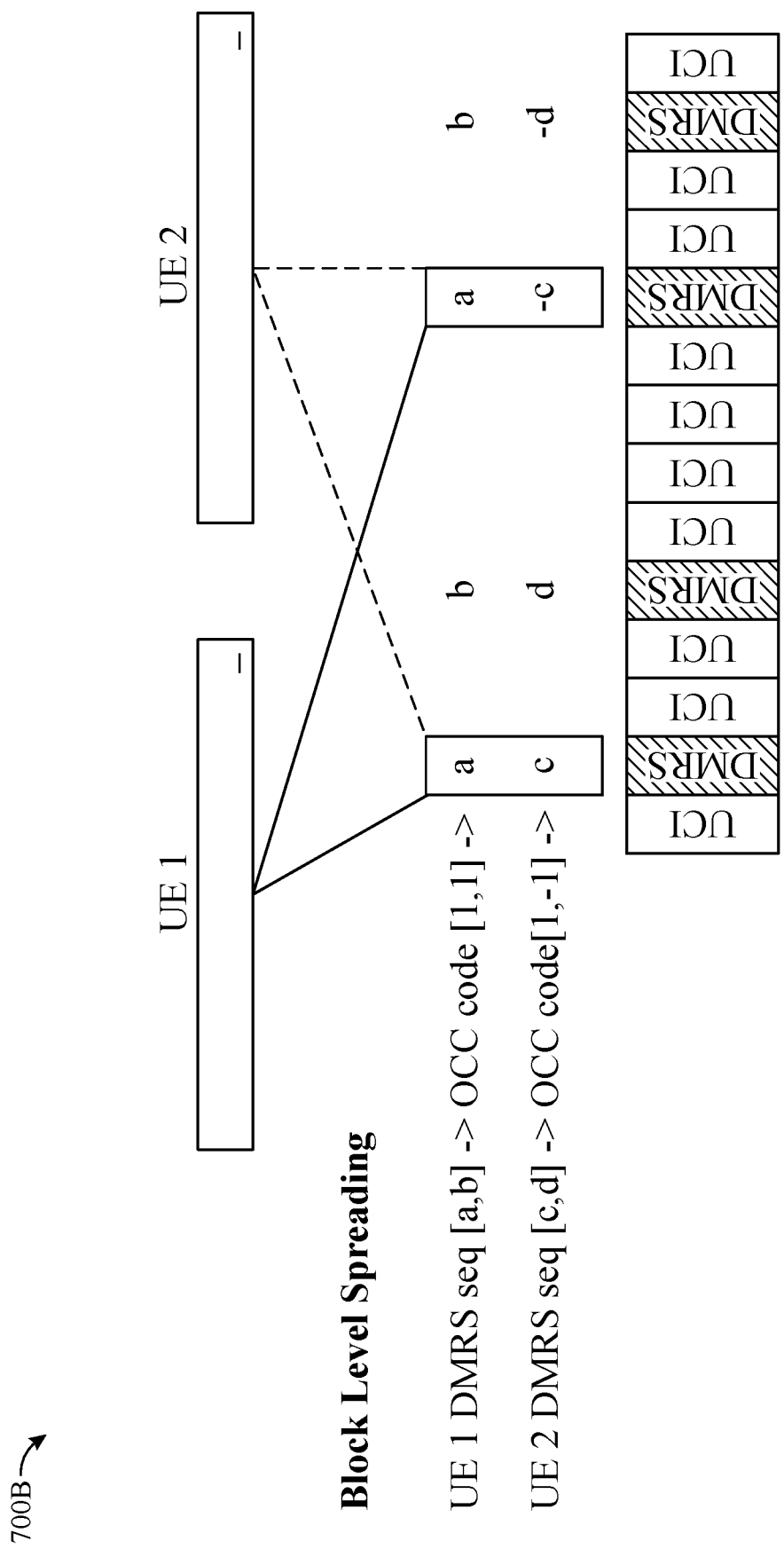
Figure 7C:
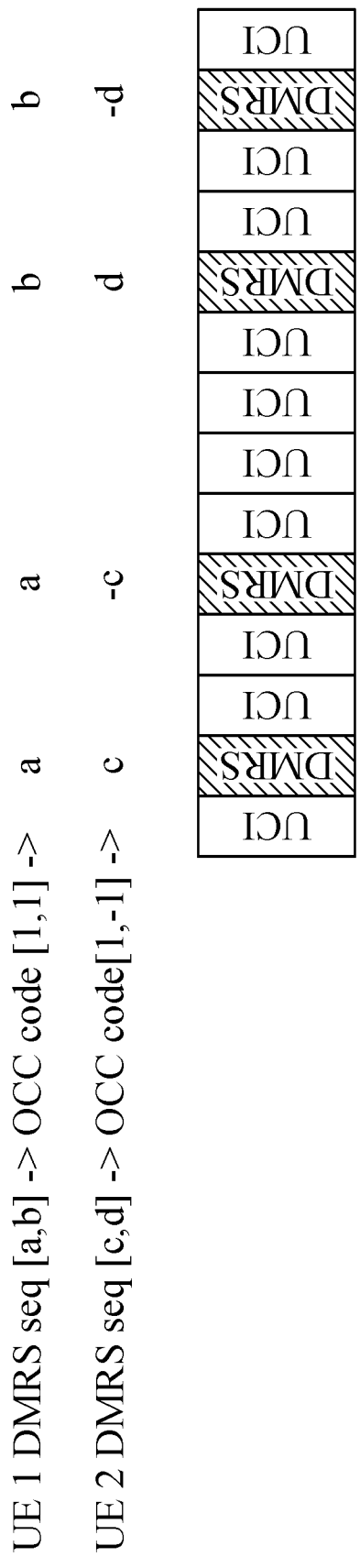

FIGS. 7A-7C illustrate example mechanism applications 700a, 700B, and 700C, respectively, for sharing UL resources for DMRS transmissions from different UEs, in accordance with certain aspects of the present disclosure.

FIG. 7A is an example mechanism application 700A for pre-DFT multiplexing of DMRS and UCI, in accordance with certain aspects of the present disclosure. As shown in the example of FIG. 7A, orthogonal MU communication for DMRSs may be achieved using an OCC for block level spreading of the DMRSs.

In the illustrated example, UE1 and UE2 are assigned (in some cases, by a network entity) different DMRS sequences to support MU transmission of DMRSs. In particular, UE1 is assigned a DMRS sequence [a,b], and UE2 is assigned a DMRS sequence [c,d]. In some cases, a network entity may assign the DMRS sequences to each of UE1 and UE2.

Further, UE1 and UE2 are assigned (in some cases, by the network entity) different mechanisms, e.g., OCCs, to be applied to DMRS symbols (e.g., symbols carrying DMRS) specific to each of UE1 and UE2 (e.g., to support MU transmission for DMRS). In particular, UE1 is assigned OCC [1,1] while UE2 is assigned OCC [1,−1]. Accordingly, the spreading length (e.g., the length between each DMRS symbol) is two symbols to achieve a final length of four symbols (e.g., the number of DMRS symbols is four).

Although FIG. 7A, illustrates UE1 and UE2 assigned different DMRS sequences, in some cases, UE1 and UE2 may be assigned the same DMRS sequence when their assigned mechanisms, e.g., OCCs, are different.

The OCC assigned to each of UE1 and UE2 is applied to the content of each OFDM symbol (e.g., each DMRS symbol), and more specifically, applied to achieve block level spreading. In particular, for UE1, application of the OCC [1,1] to DMRS sequence [a,b] creates a (block level) spread DMRS sequence of [a, b, a, b]. Similarly, for UE2, application of the OCC [1,−1] to DMRS sequence [c,d] creates a (block level) spread DMRS sequence of [c, d, −c, −d].

After applying the mechanisms, e.g., the OCCs, the DMRS symbols and UCI symbols are multiplexed using OFDM for UL transmission, DFT is performed on the UL transmission, and IFFT is performed on the UL transmission to generate a time domain waveform for transmission to a network entity.

A network entity may have knowledge of the mechanism and sequence applied by each UE because the network entity instructs which mechanism and sequence to use for the MU communication. In particular, in some cases, the network entity transmits, to each of UE1 and UE2, an indication of the mechanism to apply to allow the UEs to share the UL resources. Thus, in this example, given the network entity has knowledge of the OCCs used by each UE, the network entity receiving the waveform with UL transmissions from UE1 and UE2, may be able to distinguish the DMRSs for each of UE1 and UE2 from the received signal (with the DMRS for each superimposed).

As shown in FIG. 7B, the network entity may perform block level de-spreading, in a UE specific manner, to extract the corresponding DMRS. To extract the DMRS sequence of UE1, the network entity may add the first DMRS symbol (a+c) to the third DMRS symbol (a−c), and divide the sum by 2:

$(a+c)+(a-c)/2=a.$

Similarly, to extract the DMRS sequence from UE2, the network entity may subtract the third DMRS symbol (a−c) from the first DMRS symbol (a+c), and divide the difference by 2:

$(a+c)-(a-c)/2=c.$

The network entity may perform similar operations to extract "b" and "d" for UE1 and UE2 from the second and fourth DMRS sequences, respectively.

In this example, the network entity may determine the first DMRS is from UE1 given UE1 was assigned DMRS sequence [a,b] and the result of extracting the DMRS sequence for the first DMRS was "a". Similarly, the network entity may determine the third DMRS symbol is from UE2 given UE2 was assigned DMRS sequence [c,d] and the result of extracting the DMRS for the third DMRS was "c". The network entity may also determine the second DMRS is from UE1 (e.g., because the network entity extracted "b") and the fourth DMRS is from UE2 (e.g., because the network eneity extract "d").

As an alternative to the block level spreading shown in FIGS. 7A and 7B, symbol level spreading may also be used, as shown in the example mechanism application 700C of FIG. 7C. In particular, the OCC assigned to each of UE1 and UE2 may be applied to achieve symbol level spreading. As shown, application of the OCC [1,1] to DMRS sequence [a,b] creates a (symbol level) spread DMRS sequence of [a, a, b, b]. Similarly, for UE2, application of the OCC [1,−1] to DMRS sequence [c,d] creates a (symbol level) spread DMRS sequence of [c, −c, d, −d]. The network entity may perform similar operations as described above with respect to block level spreading to extract the DMRS for each UE in the case of symbol level spreading. However, in this case, the network entity may extract "a" and "c" using the first and second DMRS symbols and extract "b" and "d" using the third and fourth DMRS symbols.

In some cases, for pre-DFT multiplexing of DMRS and data/UCI (e.g., non-orthogonal MU) for DMRS, different DMRS sequences may be used to support MU for DMRS. For example, different UEs may use the same sequence generator but with different initialization seed(s) assigned to each of the UEs, to generate different DMRS sequences (e.g., DMRS sequence [a,b] for UE1 and DMRS sequence [c,d] for UE2).

MU communication for UCI/data is typically performed in an orthogonal fashion, as non-orthogonal MU communication for UCI/data tends to lead to large performance degradation. For pre-DFT multiplexing of DMRS and data/UCI, orthogonal MU communication for UCI/data may also be achieved using OCCs.

Figure 8A:
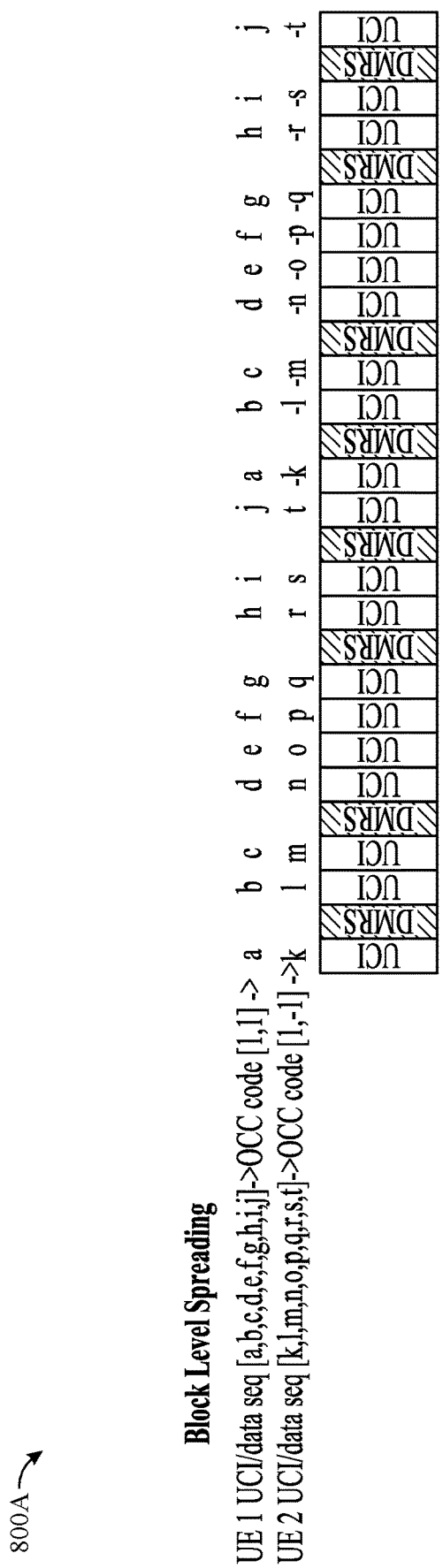
FIGS. 8A and 8B illustrate example mechanism applications for sharing UL resources for information (e.g., uplink control information UCI)/data) transmissions from different UEs, in accordance with certain aspects of the present disclosure.
Figure 8B:
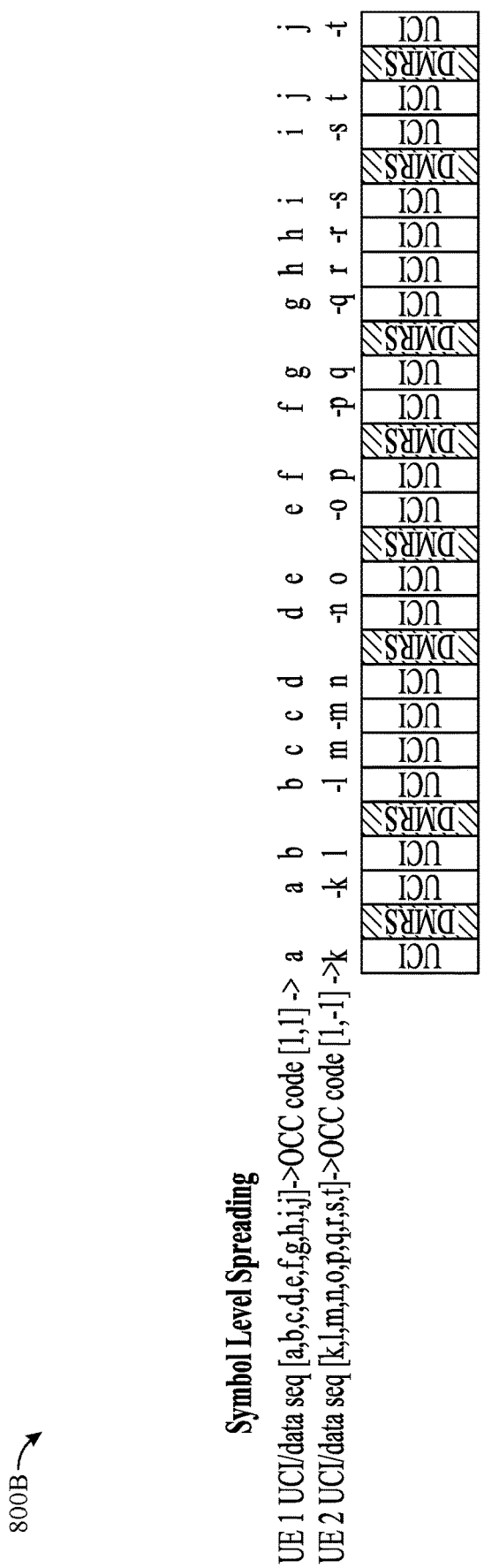

For example, FIGS. 8A and 8B illustrate example mechanism applications 800A and 800B, respectively, for sharing UL resources for information (e.g., UCI/data) transmissions from different UEs, in accordance with certain aspects of the present disclosure. As illustrated in FIGS. 8A and 8B, OCCs may also be used to achieve block level spreading or symbol level spreading for UCI (and/or data). In the illustrated examples of FIGS. 8A and 8B, UE1 may again be assigned an OCC of [1,1], and UE2 may again be assigned an OCC of [1,−1]. In this example, however, UE1 may be assigned a UCI/data sequence of [a,b,c,d,e,f,g,h,i,j], while UE2 may be assigned a UCI/data sequence of [k,l,m,n,o,p,q,r,s,t].

As shown in FIG. 8B, the OCC assigned to each of UE1 and UE2 may be applied to the content of each OFDM symbol (e.g., each UCI/data symbol), and more specifically, may be applied to achieve block level spreading. In particular, for UE1, application of the OCC [1,1] to UCI/data sequence [a,b,c,d,e,f,g,h,i,j] creates a (block level) spread UCI/data sequence of [a,b,c,d,e,f,g,h,i,j, a,b,c,d,e,f,g,h,i,j]. Similarly, for UE2, application of the OCC [1,−1] to UCI/data sequence [k,l,m,n,o,p,q,r,s,t] creates a (block level) spread UCI/data sequence of [k,l,m,n,o,p,q,r,s,t, k,l,m,n,o,p, q,r,s,t].

Alternatively, as shown in FIG. 8B, the OCC assigned to each of UE1 and UE2 may be applied to the content of each OFDM symbol (e.g., each UCI/data symbol), and more specifically, may be applied to achieve symbol level spreading. In particular, for UE1, application of the OCC [1,1] to UCI/data sequence [a,b,c,d,e,f,g,h,i,j] creates a (symbol level) spread UCI/data sequence of [a,a,b,b,c,c,d,d,e,e,f,f,g, g,h,h,i,i,j,j]. Similarly, for UE2, application of the OCC [1,-1] to UCI/data sequence [k,l,m,n,o,p,q,r,s,t] creates a (symbol level) spread UCI/data sequence of [k,-k,l,-l,m,-m,n,-n,o,-o,p,-p,q,-q,r,-r, s,-s,t,-t].

Again, with knowledge of the OCCs assigned to each UE, a network entity receiving the waveform with the superimposed transmission from each UE (using pre-DFT multiplexing) can extract the signals from each of UE1 and UE2. For example, the network entity may add/subtract the first and eleventh UCI/data symbols of FIG. 8A to extract UCI/data sequence components a and k. A similar process may be performed for the remaining eighteen UCI/data symbols of the total twenty UCI/data symbols.

While mechanisms for DMRS and UCI/data pre-DFT multiplexing are shown separately in FIGS. 7A-C and FIGS. 8A-8B, in practice, these mechanisms may be combined such that DMRSs and UCI/data are both pre-DFT multiplexed. Similarly, pre-DFT DMRS multiplexing using different DMRS sequences may be combined with UCI/data pre-DFT multiplexing.

Example Wireless Communications Devices

Figure 9:
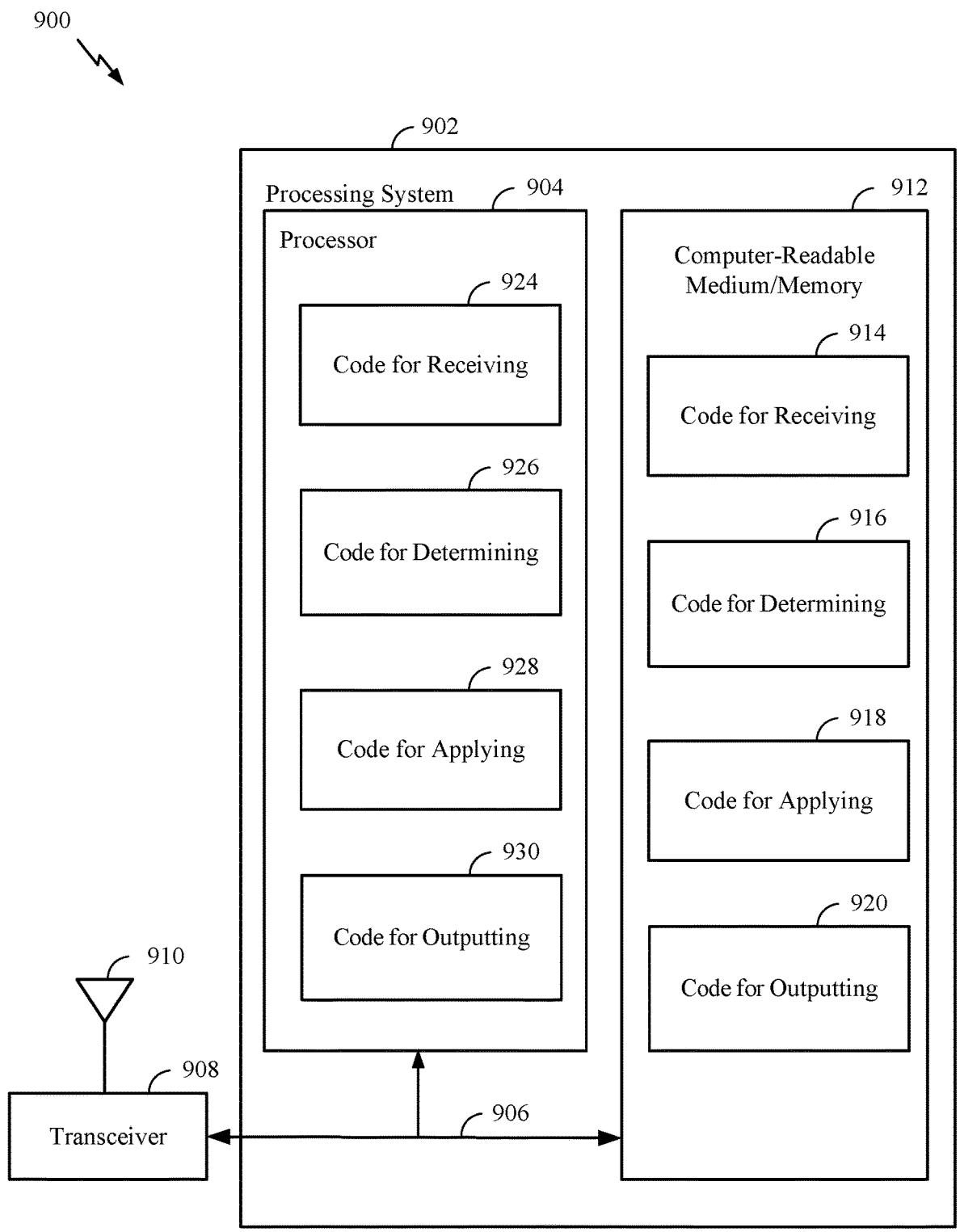
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) operable, configured, or adapted to perform operations for the techniques disclosed herein, such as the operations described with respect to FIG. 5. In some examples, communications device 900 may be a user equipment (UE), such as UE 120a described with respect to FIGS. 1 and 2.

Communications device 900 includes a processing system 902 coupled to a transceiver 908 (e.g., a transmitter and/or a receiver). Transceiver 908 is configured to transmit and receive signals for communications device 900 via an antenna 910, such as the various signals as described herein. Processing system 902 may be configured to perform processing functions for communications device 900, including processing signals received and/or to be transmitted by communications device 900.

Processing system 902 includes a processor 904 coupled to a computer-readable medium/memory 912 via a bus 906. In certain aspects, computer-readable medium/memory 912 is configured to store instructions (e.g., computer-executable code) that when executed by processor 904, cause processor 904 to perform the operations illustrated in FIG. 5, or other operations for performing the various techniques discussed herein.

In certain aspects, computer-readable medium/memory 912 stores code 914 (an example means for) for receiving (e.g., for receiving, from a network entity, an indication of a mechanism to apply to allow the UE to share uplink (UL) resources with at least one other UE for UL transmission); code 916 (an example means for) for determining (e.g., for determining a mechanism to allow the UE to share UL resources with at least one other UE for UL transmission); code 918 (an example means for) for applying (e.g., for applying the mechanism to at least one of reference signal (RS) symbols or information symbols to be multiplexed using orthogonal frequency division multiplexing (OFDM) before performing a discrete Fourier transform (DFT) for the UL transmission); and code 920 (an example means for) for outputting (e.g., for outputting a waveform for the UL transmission after performing the DFT and an inverse fast Fourier transform (IFFT)).

In certain aspects, processor 904 has circuitry configured to implement the code stored in computer-readable medium/memory 912. Processor 904 includes circuitry 924 (an example means for) for receiving (e.g., for receiving, from a network entity, an indication of a mechanism to apply to allow the UE to share UL resources with at least one other UE for UL transmission); circuitry 926 (an example means for) for determining (e.g., for determining a mechanism to allow the UE to share UL resources with at least one other UE for UL transmission); circuitry 928 (an example means for) for applying (e.g., for applying the mechanism to at least one of RS symbols or information symbols to be multiplexed using OFDM before performing a DFT for the UL transmission; and circuitry 930 (an example means for) for outputting (e.g., for outputting a waveform for the UL transmission after performing the DFT and an IFFT).

In some cases, the operations illustrated in FIG. 5, as well as other operations described herein, may be implemented by one or more means-plus-function components. For example, in some cases, such operations may be implemented by means for receiving, means for determining, means for applying, and means for outputting.

In some cases, means for determining, means for applying, and means for outputting, includes a processing system, which may include one or more processors, such as receive processor 258, transmit processor 264, TX MIMO processor 266, and/or the controller/processor 280 of UE 120a illustrated in FIG. 2 and/or processing system 902 of communications device 900 in FIG. 9.

Transceiver 1108 may provide a means for receiving or transmitting information. Information may be passed on to other components of communications device 900. Antenna 910 may correspond to a single antenna or a set of antennas. Transceiver 908 may provide means for transmitting signals generated by other components of communications device 900.

Means for receiving or means for obtaining may include a receiver (such as receive processor 258) or antenna(s) 252 of UE 120a illustrated in FIG. 2. Means for transmitting or means for outputting may include a transmitter (such as the transmit processor 264) or antenna(s) 252 of UE 120a illustrated in FIG. 2.

Notably, FIG. 9 is just use one example, and many other examples and configurations of communications device 900 are possible.

Figure 10:
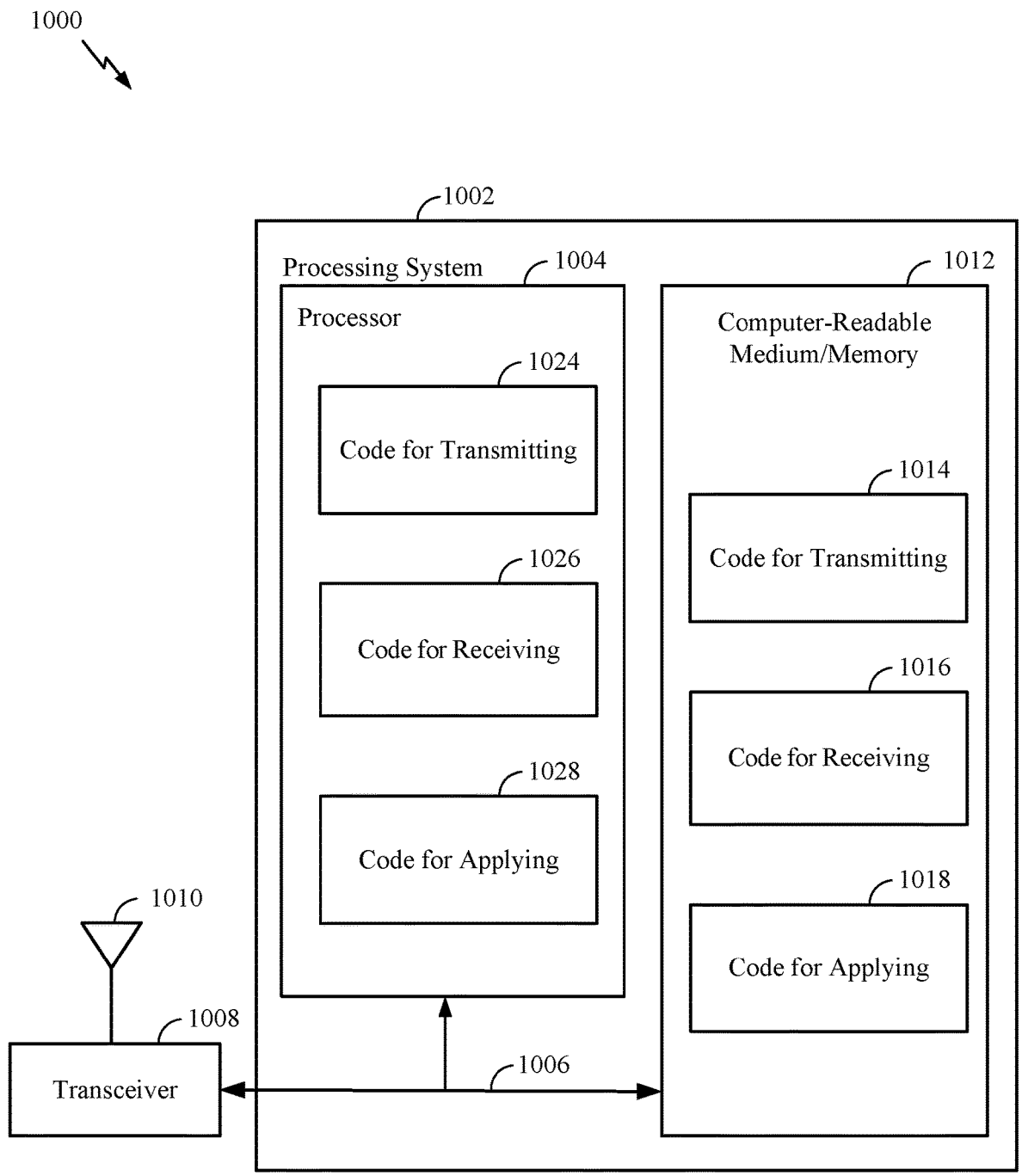
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) operable, configured, or adapted to perform operations for the techniques disclosed herein, such as the operations described with respect to FIG. 6. In some examples, communications device 1000 may be a network entity, such as base station (BS) 110a described with respect to FIGS. 1 and 2.

Communications device 1000 includes a processing system 1002 coupled to a transceiver 1008 (e.g., a transmitter and/or a receiver). Transceiver 1008 is configured to transmit and receive signals for communications device 1000 via an antenna 1010, such as the various signals as described herein. Processing system 1002 may be configured to perform processing functions for communications device 1000, including processing signals received and/or to be transmitted by communications device 1000.

Processing system 1002 includes a processor 1004 coupled to a computer-readable medium/memory 1012 via a bus 1006. In certain aspects, computer-readable medium/ memory 1012 is configured to store instructions (e.g., computer-executable code) that when executed by processor 1004, cause processor 1004 to perform the operations illustrated in FIG. 6, or other operations for performing the various techniques discussed herein.

In certain aspects, computer-readable medium/memory 1012 stores code 1014 (an example means for) for transmitting (e.g., for transmitting, to the different UEs, an indication of the mechanism to apply to allow the different UEs to share the UL resources for the UL transmissions); code 1016 (an example means for) for receiving (e.g., for receiving a waveform with UL transmissions from different UEs on shared UL resources; and code 1018 (an example means for) for applying (e.g., for applying a mechanism to distinguish at least one of RS symbols or information symbols multiplexed using OFDM from the different UEs after performing a FFT of the waveform, extracting tones for each of the different UEs, and performing an IDFT).

In certain aspects, processor 1004 has circuitry configured to implement the code stored in the computer-readable medium/memory 1012. Processor 1004 includes circuitry 1024 (an example means for) for transmitting (e.g., for transmitting, to the different UEs, an indication of the mechanism to apply to allow the different UEs to share the UL resources for the UL transmissions); circuitry 1026 (an example means for) for receiving (e.g., for receiving a waveform with UL transmissions from different UEs on shared UL resources); and circuitry 1028 (an example means for) for applying (e.g., for applying a mechanism to distinguish at least one of RS symbols or information symbols multiplexed using OFDM from the different UEs after performing a FFT of the waveform, extracting tones for each of the different UEs, and performing an IDFT.

In some cases, the operations illustrated in FIG. 6, as well as other operations described herein, may be implemented by one or more means-plus-function components. For example, in some cases, such operations may be implemented by means for transmitting, means for receiving, and means for applying.

In some cases, means for applying includes a processing system, which may include one or more processors, such as receive processor 238, transmit processor 220, TX MIMO processor 230, and/or controller/processor 240 of BS 110a illustrated in FIG. 2 and/or processing system 1002 of communications device 1000 in FIG. 10.

Transceiver 1008 may provide a means for receiving or transmitting information. Information may be passed on to other components of communications device 1000. Antenna 1010 may correspond to a single antenna or a set of antennas. Transceiver 1008 may provide means for transmitting signals generated by other components of communications device 1000.

Means for receiving or means for obtaining may include a receiver (such as receive processor 238) or antenna(s) 234 of BS 110a illustrated in FIG. 2. Means for transmitting or means for outputting may include a transmitter (such as the transmit processor 220) or antenna(s) 234 of BS 110a illustrated in FIG. 2.

Notably, FIG. 10 is just use one example, and many other examples and configurations of communications device 1000 are possible.

Multiple User (MU) manager 122 and MU manager 112 may support wireless communication in accordance with examples as disclosed herein.

MU manager 122 and MU manager 112 may be an example of means for performing various aspects described herein. MU manager 122 and MU manager 112, or its sub-components, may be implemented in hardware (e.g., in UL resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, MU manager 122 and MU manager 112, or its sub-components, may be implemented in code (e.g., as configuration management software or firmware) executed by a processor, or any combination thereof. If implemented in code executed by a processor, the functions of MU manager 122 and MU manager 112, or its sub-components may be executed by a general-purpose processor, a DSP, an ASIC, a FPGA or other programmable logic device.

In some examples, MU manager 122 and MU manager 112 may be configured to perform various operations (e.g., receiving, determining, transmitting/sending) using or otherwise in cooperation with the transceiver 908 or 1008.

MU manager 122 and MU manager 112, or its sub-components, may be physically located at various positions, including being distributed such that portions of functions are implemented at different physical locations by one or more physical components. In some examples, MU manager 122 and MU manager 112, or its sub-components, may be a separate and distinct component in accordance with various aspects of the present disclosure. In some examples, MU manager 122 and MU manager 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Clauses

Implementation examples are described in the following numbered clauses:

Clause 1: A method for wireless communications performed by a user equipment (UE), comprising: determining a mechanism to allow the UE to share uplink (UL) resources with at least one other UE for UL transmission; applying the mechanism to at least one of reference signal (RS) symbols or information symbols to be multiplexed using orthogonal frequency division multiplexing (OFDM) before performing a discrete Fourier transform (DFT) for the UL transmission; and outputting a waveform for the UL transmission after performing the DFT and an inverse fast Fourier transform (IFFT).

Clause 2: The method of Clause 1, wherein: the UL transmission comprises a physical uplink control channel (PUCCH) or a physical uplink shared channel (PUSCH); and the information symbols comprises at least one of data symbols or uplink control information (UCI) symbols.

Clause 3: The method of Clause 1 or 2, wherein: the RS symbols comprise demodulation reference signal (DMRS) symbols; and the mechanism comprises an orthogonal cover code (OCC) applied to the DMRS symbols.

Clause 4: The method of Clause 3, wherein the OCC is applied to achieve block level spreading of the DMRS symbols.

Clause 5: The method of Clause 3 or 4, wherein the OCC is applied to achieve symbol level spreading of the DMRS symbols.

Clause 6: The method of any of Clauses 1-5, wherein the mechanism involves using different demodulation reference signal (DMRS) sequences for the UE and the at least one other UE to support multiple user (MU) transmission for DMRSs.

Clause 7: The method of Clause 6, wherein: the UE and the at least one other UE both use a same sequence generator; and the UE and the at least one other UE both use different initialization seeds for the sequence generator to generate the different DMRS sequences.

Clause 8: The method of any of Clauses 1-7, wherein the mechanism comprises an orthogonal cover code (OCC) applied to the information symbols.

Clause 9: The method of Clause 8, wherein the OCC is applied to achieve block level spreading of the information symbols.

Clause 10: The method of Clause 8 or 9, wherein the OCC is applied to achieve symbol level spreading of the information symbols.

Clause 11: The method of any of Clauses 1-10, further comprising: receiving, from a network entity, an indication of the mechanism to apply to allow the UE to share the UL resources with the at least one other UE for UL transmission; and wherein determining the mechanism is based, at least in part, on the indication.

Clause 12: A method for wireless communications performed by a network entity, comprising: receiving a waveform with uplink (UL) transmissions from different user equipments (UEs) on shared UL resources; and applying a mechanism to distinguish at least one of reference signal (RS) symbols or information symbols multiplexed using orthogonal frequency division multiplexing (OFDM) from the different UEs after performing a fast Fourier transform (FFT) of the waveform, extracting tones for each of the different UEs, and performing an inverse discrete Fourier transform (IDFT).

Clause 13: The method of Clause 12, wherein: the UL transmission comprises a physical uplink control channel (PUCCH) or a physical uplink shared channel (PUSCH); and the information symbols comprise at least one of data symbols or uplink control information (UCI) symbols.

Clause 14: The method of Clause 12 or 13, wherein: the RS symbols comprise demodulation reference signal (DMRS) symbols; and the mechanism comprises an orthogonal cover code (OCC) applied to the DMRS symbols.

Clause 15: The method of Clause 14, wherein the OCC is applied to achieve block level de-spreading of the DMRS symbols.

Clause 16: The method of Clause 14 or 15, wherein the OCC is applied to achieve symbol level de-spreading of the DMRS symbols.

Clause 17: The method of any of Clauses 12-16, wherein the mechanism involves assigning different demodulation reference signal (DMRS) sequences for the different UEs to support multiple user (MU) transmission for DMRS.

Clause 18: The method of Clause 17, wherein: the different UEs use a same sequence generator; and the different UEs are assigned different initialization seeds for the sequence generator to generate different DMRS sequences.

Clause 19: The method of any of Clauses 12-18, wherein the mechanism comprises an orthogonal cover code (OCC) applied to the information symbols.

Clause 20: The method of Clause 19, wherein the OCC is applied to achieve block level de-spreading of the information symbols.

Clause 21: The method of Clause 19 or 20, wherein the OCC is applied to achieve symbol level de-spreading of the information symbols.

Clause 22: The method of any of Clauses 12-21, further comprising transmitting, to the different UEs, an indication of the mechanism to apply to allow the different UEs to share the UL resources for the UL transmissions.

Clause 23: An apparatus, comprising: at least one processor; and a memory coupled to the at least one processor, the memory including instructions executable by the at least one processor to cause the apparatus to perform a method in accordance with any one of Clauses 1-22.

Clause 24: An apparatus, comprising means for performing a method in accordance with any one of Clauses 1-22.

Clause 25: A non-transitory computer-readable medium comprising executable instructions that, when executed by one or more processors of an apparatus, cause the apparatus to perform a method in accordance with any one of Clauses 1-22.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and B S, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications performed by a user equipment (UE), comprising:
    determining a mechanism to allow the UE to share uplink (UL) resources with at least one other UE for UL transmission, wherein determining the mechanism is based, at least in part, on an indication received from a network entity;
    applying the mechanism to at least one of reference signal (RS) symbols or information symbols to be multiplexed using orthogonal frequency division multiplexing (OFDM) before performing a discrete Fourier transform (DFT) for the UL transmission; and outputting a waveform for the UL transmission after performing the DFT and an inverse fast Fourier transform (IFFT).

2. The method of claim 1, wherein:
the UL transmission comprises a physical uplink control channel (PUCCH) or a physical uplink shared channel (PUSCH); and
the information symbols comprises at least one of data symbols or uplink control information (UCI) symbols.

3. The method of claim 1, wherein:
the RS symbols comprise demodulation reference signal (DMRS) symbols; and
the mechanism comprises an orthogonal cover code (OCC) applied to the DMRS symbols.

4. The method of claim 3, wherein the OCC is applied to achieve block level spreading of the DMRS symbols.

5. The method of claim 3, wherein the OCC is applied to achieve symbol level spreading of the DMRS symbols.

6. The method of claim 1, wherein the mechanism involves using different demodulation reference signal (DMRS) sequences for the UE and the at least one other UE to support multiple user (MU) transmission for DMRSs.

7. The method of claim 6, wherein:
the UE and the at least one other UE both use a same sequence generator; and
the UE and the at least one other UE both use different initialization seeds for the sequence generator to generate the different DMRS sequences.

8. The method of claim 1, wherein the mechanism comprises an orthogonal cover code (OCC) applied to the information symbols.

9. The method of claim 8, wherein the OCC is applied to achieve block level spreading of the information symbols.

10. The method of claim 8, wherein the OCC is applied to achieve symbol level spreading of the information symbols.

11. A method for wireless communications performed by a network entity, comprising:
transmitting, to different user equipments (UEs), an indication of a mechanism to apply to allow the different UEs to shared uplink (UL) resources for UL transmissions;
receiving a waveform with UL transmissions from the different UEs on the shared UL resources; and
applying the mechanism to distinguish at least one of reference signal (RS) symbols or information symbols multiplexed using orthogonal frequency division multiplexing (OFDM) from the different UEs after performing a fast Fourier transform (FFT) of the waveform, extracting tones for each of the different UEs, and performing an inverse discrete Fourier transform (IDFT).

12. The method of claim 11, wherein:
the UL transmission comprises a physical uplink control channel (PUCCH) or a physical uplink shared channel (PUSCH); and
the information symbols comprise at least one of data symbols or uplink control information (UCI) symbols.

13. The method of claim 11, wherein:
the RS symbols comprise demodulation reference signal (DMRS) symbols; and
the mechanism comprises an orthogonal cover code (OCC) applied to the DMRS symbols.

14. The method of claim 13, wherein the OCC is applied to achieve block level de-spreading of the DMRS symbols.

15. The method of claim 13, wherein the OCC is applied to achieve symbol level de-spreading of the DMRS symbols.

16. The method of claim 11, wherein the mechanism involves assigning different demodulation reference signal (DMRS) sequences for the different UEs to support multiple user (MU) transmission for DMRS.

17. The method of claim 16, wherein:
the different UEs use a same sequence generator; and
the different UEs are assigned different initialization seeds for the sequence generator to generate different DMRS sequences.

18. The method of claim 11, wherein the mechanism comprises an orthogonal cover code (OCC) applied to the information symbols.

19. The method of claim 18, wherein the OCC is applied to achieve block level de-spreading of the information symbols.

20. The method of claim 18, wherein the OCC is applied to achieve symbol level de-spreading of the information symbols.

21. An apparatus for wireless communications performed by a user equipment (UE), comprising:
at least one processor; and
a memory coupled to the at least one processor, the memory including instructions executable by the at least one processor to cause the apparatus to:
determine a mechanism to allow the UE to share uplink (UL) resources with at least one other UE for UL transmission, wherein determining the mechanism is based, at least in part, on an indication received from a network entity;
apply the mechanism to at least one of reference signal (RS) symbols or information symbols to be multiplexed using orthogonal frequency division multiplexing (OFDM) before performing a discrete Fourier transform (DFT) for the UL transmission; and
output a waveform for the UL transmission after performing the DFT and an inverse fast Fourier transform (IFFT).

22. The apparatus of claim 21, wherein:
the UL transmission comprises a physical uplink control channel (PUCCH) or a physical uplink shared channel (PUSCH); and
the information symbols comprises at least one of data symbols or uplink control information (UCI) symbols.

23. The apparatus of claim 21, wherein:
the RS symbols comprise demodulation reference signal (DMRS) symbols; and
the mechanism comprises an orthogonal cover code (OCC) applied to the DMRS symbols.

24. The apparatus of claim 21, wherein the mechanism comprises an orthogonal cover code (OCC) applied to the information symbols.

25. An apparatus for wireless communications performed by a network entity, comprising:
at least one processor; and
a memory coupled to the at least one processor, the memory including instructions executable by the at least one processor to cause the apparatus to:
transmit, to different user equipments (UEs), an indication of a mechanism to apply to allow the different UEs to shared uplink (UL) resources for UL transmissions;
receive a waveform with UL transmissions from the different UEs on the shared UL resources; and
apply the mechanism to distinguish at least one of reference signal (RS) symbols or information symbols multiplexed using orthogonal frequency division multiplexing (OFDM) from the different UEs after performing a fast Fourier transform (FFT) of the waveform, extracting tones for each of the different UEs, and performing an inverse discrete Fourier transform (IDFT).

26. The apparatus of claim 25, wherein:

the UL transmission comprises a physical uplink control channel (PUCCH) or a physical uplink shared channel (PUSCH); and the information symbols comprise at least one of data symbols or uplink control information (UCI) symbols.

27. The apparatus of claim 25, wherein:

the RS symbols comprise demodulation reference signal (DMRS) symbols; and the mechanism comprises an orthogonal cover code (OCC) applied to the DMRS symbols.

28. The apparatus of claim 25, wherein the mechanism comprises an orthogonal cover code (OCC) applied to the information symbols.

\* \* \* \* \*